US009009298B2

(12) United States Patent
Besehanic et al.

(10) Patent No.: US 9,009,298 B2
(45) Date of Patent: Apr. 14, 2015

(54) METHODS AND APPARATUS TO DETERMINE AUDIENCE ENGAGEMENT INDICES ASSOCIATED WITH MEDIA PRESENTATIONS

(75) Inventors: Jan Besehanic, Tampa, FL (US); Arun Ramaswamy, Tampa, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 571 days.

(21) Appl. No.: 12/965,505

(22) Filed: Dec. 10, 2010

(65) Prior Publication Data
US 2012/0150958 A1 Jun. 14, 2012

(51) Int. Cl.
G06F 15/173 (2006.01)
G06F 15/16 (2006.01)
G06Q 30/02 (2012.01)
H04H 60/31 (2008.01)
H04H 60/66 (2008.01)
H04H 60/33 (2008.01)

(52) U.S. Cl.
CPC ........... *G06Q 30/0201* (2013.01); *H04H 60/31* (2013.01); *H04H 60/33* (2013.01); *H04H 60/66* (2013.01)

(58) Field of Classification Search
USPC ................................. 709/204, 224
See application file for complete search history.

(56) References Cited

U.S. PATENT DOCUMENTS

| 4,907,079 | A | 3/1990 | Turner et al. |
| 5,508,731 | A | 4/1996 | Kohorn |
| 6,807,566 | B1 * | 10/2004 | Bates et al. .................... 709/206 |
| 7,363,243 | B2 | 4/2008 | Arnett et al. |
| 7,483,975 | B2 | 1/2009 | Kolessar et al. |
| 8,219,447 | B1 * | 7/2012 | Ieong et al. ................ 705/14.43 |
| 2002/0152117 | A1 * | 10/2002 | Cristofalo et al. .............. 705/14 |
| 2003/0177488 | A1 * | 9/2003 | Smith et al. ....................... 725/9 |
| 2004/0111738 | A1 * | 6/2004 | Gunzinger ........................ 725/9 |
| 2006/0143081 | A1 * | 6/2006 | Argaiz ............................ 705/14 |
| 2007/0067267 | A1 | 3/2007 | Ives |
| 2008/0140506 | A1 | 6/2008 | Christianson et al. |
| 2008/0154958 | A1 * | 6/2008 | Sloo et al. .................. 707/104.1 |
| 2008/0183552 | A1 * | 7/2008 | O'Hagan ........................ 705/10 |
| 2009/0099919 | A1 * | 4/2009 | Schultheiss et al. ............ 705/14 |
| 2009/0164408 | A1 | 6/2009 | Grigorik et al. |
| 2009/0187932 | A1 * | 7/2009 | Rathburn et al. ................. 725/9 |
| 2009/0210290 | A1 * | 8/2009 | Elliott et al. .................... 705/10 |
| 2009/0216741 | A1 | 8/2009 | Thrall et al. |
| 2010/0211439 | A1 * | 8/2010 | Marci et al. ..................... 705/10 |
| 2010/0235219 | A1 * | 9/2010 | Merrick et al. ................. 705/10 |

OTHER PUBLICATIONS

Fink et al., "Social- and Interactive-Television Applications Based on Real-Time Ambient-Audio Identification," European Interactive TV Conference (Euro-ITV), 2006, 10 pages.

* cited by examiner

*Primary Examiner* — Larry Donaghue
(74) *Attorney, Agent, or Firm* — Hanley, Flight & Zimmerman, LLC

(57) ABSTRACT

Methods, apparatus, and articles of manufacture to determine audience engagement indices associated with media presentations are disclosed. An example method involves determining an Internet engagement index based on a quantity of messages posted on an Internet service and containing a keyword associated with a media presentation. The example method also involves determining a composite engagement index based on the Internet engagement index and a survey engagement index based on a survey of panel members exposed to the media presentation.

26 Claims, 5 Drawing Sheets

| MEDIA PROGRAM LISTING | | |
|---|---|---|
| TITLE | NETWORK | AIR DATE |
| "THE DAILY SHOW" | COMEDY CENTRAL | 7/22/2010 |
| "MYTH BUSTERS" | DISCOVERY | 7/22/2010 |
| "ALL MY CHILDREN" | ABC | 7/22/2010 |
| "TODAY" | NBC | 7/22/2010 |

MEDIA PROGRAMMING DATABASE

114

| USER | POST DATE | MESSAGE | |
|---|---|---|---|
| DSMITH | 7/22/2010 | that waz a gr8 myth busters episode | 302 |
| BWHITAKER | 7/22/2010 | Those myth busters are always proving science right! Great work guys :). | 304 |

INTERNET MESSAGE DATABASE

106

METHODS AND APPARATUS TO DETERMINE AUDIENCE ENGAGEMENT INDICES ASSOCIATED WITH MEDIA PRESENTATIONS

FIELD OF THE DISCLOSURE

The present disclosure relates generally to monitoring media and, more particularly, to methods and apparatus to determine audience engagement indices associated with media presentations.

BACKGROUND

Traditionally, audience measurement entities determine audience size and demographic composition for media based on registered panel members. That is, an audience measurement entity enrolls people that consent to being monitored into a panel. The audience measurement entity then monitors the media habits of those panel members to identify media presentations (e.g., television programs, radio programs, Internet browsing, video on demand access, etc.) exposed to those panel members. The audience measurement entity can then determine the size and demographic composition of audience(s) for those media presentations based on the collected media measurement data.

DETAILED DESCRIPTION

Figure 1:
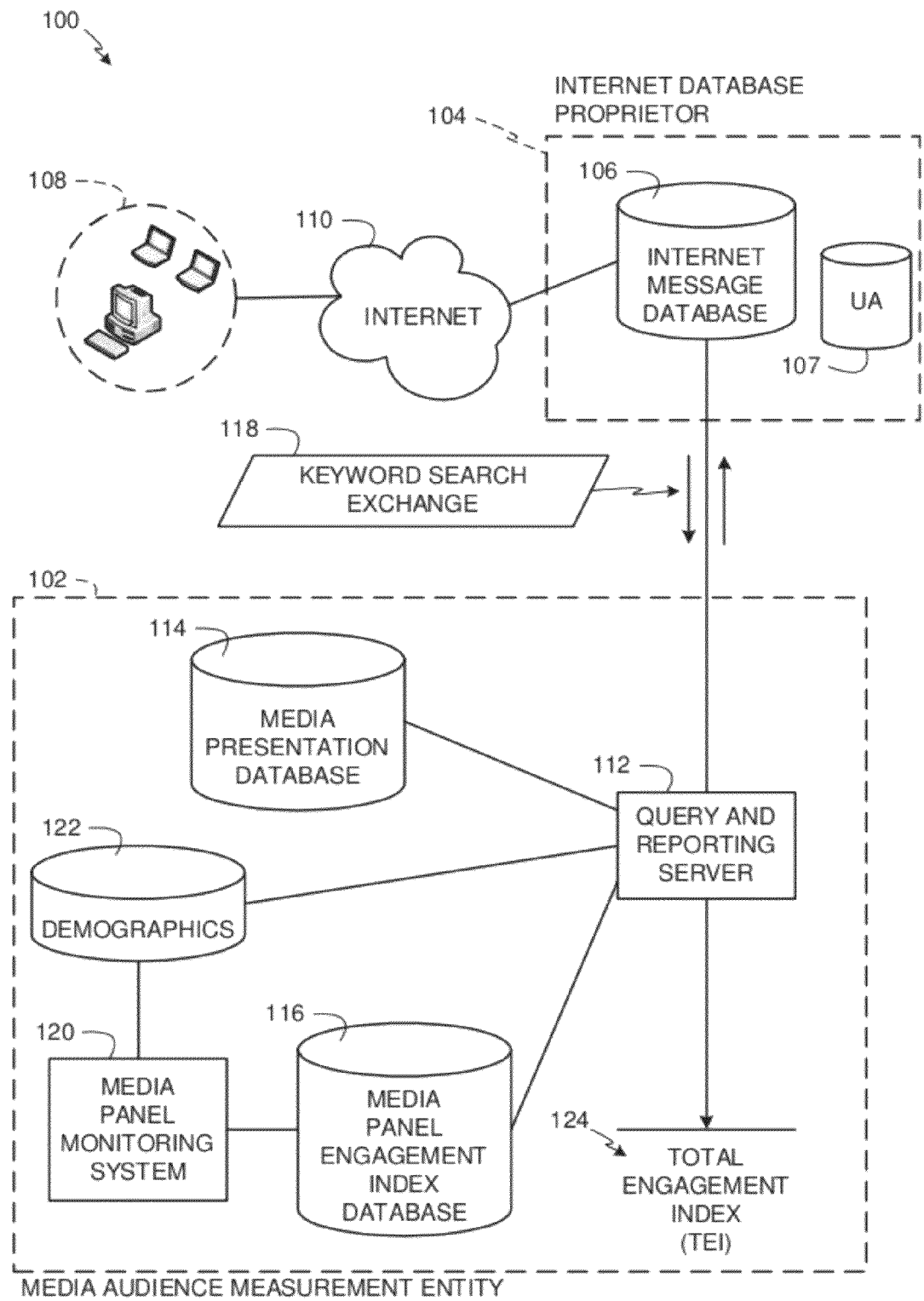
FIG. 1 depicts an example system that may be used to determine audience engagement indices for media presentations based on exposure data measured from media panels and on Internet message postings.

Example methods, apparatus, systems, and articles of manufacture disclosed herein may be used to determine audience engagement indices associated with media presentations based on measured media panel exposure data and on audience engagement levels determined from Internet message postings. As used herein, an engagement index (or indice) is a value selected to quantify the amount of interest in a media presentation. Some traditional techniques for determining engagement indices involve surveying audience members with questions to elicit responses indicative of an amount of interest by those audience members in select media presentations. Other traditional techniques for determining engagement indices involve registering audience members who consent to having their media habits monitored. A media audience measurement entity can then track the media habits of the audience panel (i.e., the registered audience members) and determine engagement indices based on the collected media exposure data. In some examples, the media audience measurement entity may also conduct surveys of some or all of the panelists to correlate audience member responses with the collected media exposure data to determine one or more engagement indices for different target media presentations.

Example methods, apparatus, and/or articles of manufacture determine one or more engagement indices for any type of media presentation (e.g., television programs, radio programs, Internet-based media, advertisements, video on demand, media content, etc.). Thus, examples disclosed herein may be adapted to determine engagement indices for any type of media presentation including programming content and/or advertisements. As used herein, media presentation is generic to any form of media (e.g., content, advertisements, etc.). Also, "media content" refers to programming (e.g., news, sit-coms, television series, feature films, etc.) as opposed to advertisements.

Unlike traditional techniques that rely on collected media exposure data and/or audience survey responses collected from panelists, example methods, apparatus, systems, and articles of manufacture disclosed herein advantageously leverage characteristics of Internet-based message postings evidencing users' consumption, involvement and/or engagement with those media presentations. Such consumption involvement and/or engagement is evidenced when, for example, users discuss media presentations (e.g., television or radio programs, advertisements, etc.) on message or discussion boards (e.g., social network sites, blogs, discussion boards, and/or any other Internet-based discussion mediums). Such discussions or postings are indicative of audience engagement levels in such media programs. Examples disclosed herein use Internet message-based engagement indices (hereinafter "Internet engagement indices") in connection with engagement indices determined using traditional techniques (hereinafter "survey engagement indices") to generate relatively more accurate engagement indices (hereafter "composite engagement indices") encompassing a larger audience base (e.g., panelist audience members and non-panelist audience members contributing to Internet-based message postings).

Some example methods to determine audience engagement indices associated with media presentations involve determining an Internet engagement index based on a quantity of matches between a keyword associated with a media presentation and messages posted on an Internet service. Some such example methods also involve determining a total engagement index (TEI) (or a composite engagement index) based on the Internet engagement index and a survey engagement index indicative of an engagement measure of panel members to the media presentation. In some example implementations, the quantity of registered users of an Internet service may be significantly more than the quantity of audience members in a media panel managed by a media audience measurement entity. In such example implementations, the Internet engagement index determined based on messages posted on the Internet service may be weighted using a first weighting value proportional to the quantity of registered users of the Internet service. In addition, the survey engagement index determined based on the media panel members may be weighted using a second weighting value proportional to the quantity of audience members of the media panel. The TEI may then be equated to the average of weighted values for the Internet engagement index and the survey engagement index.

FIG. 1 illustrates an example system 100 to determine composite audience engagement indices and/or TEIs for media presentations based on engagement levels measured from media panels and Internet message postings. In the illustrated example of FIG. 1, the example system 100 includes an example audience measurement entity 102 and an Internet database proprietor 104 that hosts an Internet message database 106. The audience measurement entity 102 may work with any entity (e.g., an Internet service provider) having a database (e.g., the Internet message database 106) storing messages posted by individuals (e.g., registered users of the Internet service provider). Such entities may be referred to as "database proprietors" (e.g., the Internet database proprietor 104). Example database proprietors include entities such as Facebook, Myspace, Google, Yahoo!, MSN, Twitter, Apple iTunes, television network websites, radio network websites, etc. There are many database proprietors operating on the Internet. These database proprietors provide one or more services to large numbers of subscribers. That is, in exchange for the provision of the service, the subscribers register with the proprietor. As part of this registration, database proprietors may collect information from the subscribers including, for example, unique usernames, demographic information, etc. In the illustrated example of FIG. 1, the Internet database proprietor stores user account information including demographics information in a user account (UA) database 107.

In the illustrated example of FIG. 1, the Internet message database 106 receives, stores, and hosts messages posted by users via, for example, computing devices 108 in communication with to the Internet database proprietor 104 through the Internet 110. In illustrated examples, the messages may be posted by users on message boards, message walls, blogs, discussion boards, and/or any other messaging or discussion medium(s) that are intended to be accessible by other users and/or generally accessible by people browsing the Internet. Whether messages are accessible to the example system of FIG. 1 may be based on terms of service (TOS) agreements or privacy policies of the Internet database proprietor 104. For messages accessible to the example system of FIG. 1, such messages may be accessed using one or more application program interfaces (APIs) made available by the Internet database proprietor 104 for accessing and/or searching the Internet message database 106.

Figure 2:
FIG. 2 depicts an example media programming database storing metadata about scheduled media presentations.

In the illustrated example of FIG. 1, the media audience measurement entity 102 includes an example query and reporting server 112 in communication with an example media presentation database 114 and an example media panel engagement index database 116. The example query and reporting server 112 of FIG. 1 is configured to generate a total engagement index (TEI) 124 (i.e., a composite engagement index) as described below. In some examples, the query and reporting server 112 is implemented using the example apparatus 400 of FIG. 4. The media presentation database 114 stores metadata for media presentations including, for example, television programming, radio programming, Internet-based programming, advertisements, and/or any other type of media content. An example excerpt from the media presentation database 114 is shown in FIG. 2. As shown in FIG. 2, metadata in the example media presentation database 114 includes program titles (e.g., "The Daily Show", "Myth Busters", "All My Children", and "Today"). In some examples, the metadata stored in the presentations of the media presentation database 114 may also include network names (as shown in FIG. 2), air dates (as shown in FIG. 2), air times, actor/actress names, program categories, etc. Although not shown, the media presentation database 114 may also include metadata for aired advertisements. Such advertisement metadata may include brand names, product/service categories, product/service types, trademarks, service marks, catch phrases, etc. Although the following examples discuss determining engagement indices for media programs or presentations, such examples are equally applicable to determining engagement indices for advertisements.

Figure 3:
FIG. 3 depicts an example Internet message database storing messages from users of an Internet service provider.

In the illustrated example of FIG. 1, the query and reporting server 112 uses the metadata stored in the media presentation database 114 to select keywords searchable in Internet message postings to determine when users responsible for such message postings are referring to particular media presentations in their messages. For example, for the television show "Myth Busters," the example query and reporting server 112 may perform a keyword search exchange 118 with the Internet message database 106 based on a keyword search string "myth busters" selected from the title of the television show. For example, referring to FIG. 3, the Internet message database 106 stores messages from registered users of the Internet database proprietor 104. In the illustrated example of FIG. 3, contents of messages 302 and 304 include the phrase "myth busters." Thus, when the example query and reporting server 112 of FIG. 1 performs a search query in the Internet message database 106 based on the search string "myth busters," the Internet message database 106 returns an indication of at least two matches corresponding to the messages 302 and 304. If matches are found in other messages in the Internet message database 106, the example Internet message database 106 of FIG. 1 will also report those matches to the query and reporting server 112 as part of the keyword search exchange 118. In the illustrated examples, the query and reporting server 112, uses the quantity (e.g., a number) of matches reported by the Internet message database 106 to determine an Internet engagement index for the corresponding media program for which the search was conducted in the Internet message database 106. The Internet engagement indices determined by the query and reporting server 112 of FIG. 1 based on Internet message postings are also referred to herein as Internet message-based engagement indices.

Returning to FIG. 1, the example media panel engagement index database 116 stores survey engagement indices for one or more media presentations represented in the media presentation database 114. The survey engagement indices in the media panel engagement index database 116 are also referred to herein as media panel engagement indices and are determined by a media panel monitoring system 120. In the illustrated example of FIG. 1, the media panel monitoring system 120 monitors audience members that have agreed to be part of a media panel (e.g., a television audience panel, a radio audience panel, an Internet audience panel, a TV/Internet audience panel, a radio/Internet audience panel, a TV/radio/Internet audience panel, etc.) and have, thus, consented to having their media habits monitored by the media audience measurement entity 102. Based on the data collected using such monitoring, the media panel monitoring system 120 repeatedly determines survey engagement indices for different media presentations represented in the media presentation database 114. In some examples, the survey engagement indices are developed through surveys of panelists that are exposed to the media in question. For example, the media audience measurement entity 102 and/or the media panel monitoring system 120 may use the panelist responses to assess levels of engagement by panelists with media in question and generate the survey engagement indices based on the assessed levels of engagement. The media panel monitoring system 120 stores the survey engagement indices in the media panel engagement index database 116. In some examples, panels may be organized based on audience member demographics. In such examples, some survey engagement indices stored in the media panel engagement index database 116 may correspond to respective demographic groups.

In the illustrated example of FIG. 1, when individuals join a panel monitored by the media panel monitoring system 120, they provide detailed information concerning their identity and demographics (e.g., gender, race, income, home location, occupation, etc) to the media audience measurement entity 102 tracking that panel. The media audience measurement entity 102 is provided with a demographics database 122 to store demographic information corresponding to panelists.

In the illustrated example of FIG. 1, the query and reporting server 112 generates the total engagement index (TEI) 124 based on survey engagement indices from the media panel engagement index database 116 and Internet engagement indices derived from messages in the Internet message database 106. For example, the example query and reporting server 112 of FIG. 1 employs example Equation 1 below to determine the TEI 124.

$$TEI=((WT_P*EI_P)+(WT_I*EI_I))/(WT_P+WT_I) \quad \text{Equation 1}$$

In Equation 1 above, TEI is the TEI 124, $WT_P$ is a panel weighting value, $EI_P$ is a survey engagement index, $WT_I$ is an Internet weighting value, and $EI_I$ is an Internet engagement index. In Equation 1 above, the TEI 124 for a particular media presentation is an average of a weighted survey engagement index ($WT_P*EI_P$) and a weighted Internet engagement index ($WT_I*EI_I$). In particular, the TEI 124 is equal to the sum of the weighted survey engagement index ($WT_P*EI_P$) and the weighted Internet engagement index ($WT_I*EI_I$) divided by the sum of the panel weighting value ($WT_P$) and the Internet weighting value ($WT_I$). The query and reporting server 112 of the illustrated example retrieves the survey engagement index ($EI_P$) from the media panel engagement index database 116. The query and reporting server 112 of the illustrated example determines the Internet panel engagement index ($EI_I$) by tallying the quantity of messages from unique users (e.g., keyword matches in multiple messages from the same registered user are counted as only one match or one exposure by that registered user to the target media presentation) in the Internet message database 106 that mention the keyword (e.g., the title) associated with a target media presentation and dividing that quantity by the total quantity of registered users of the Internet database proprietor 104 eligible for posting messages stored in the Internet message database 106.

In the example of FIG. 1, the panel weighting value ($WT_P$) is proportional to a quantity of audience members of a media panel used to determine the TEI 124. The Internet weighting value ($WT_I$) is proportional to the quantity of registered users of an Internet service (e.g., the Internet database proprietor 106) storing the user messages that were used to develop the Internet engagement index ($EI_I$). In some examples, the Internet weighting value ($WT_I$) may be set equal to the quantity of registered users of the Internet database proprietor 106, and the panel weight value ($WT_P$) may be set equal to the quantity of audience members of the panel used to determine the TEI 124. In some examples, the weight values ($WT_P$) and ($WT_I$) may be set equal to 1 in Equation 1 if the quantity of registered users of the Internet database proprietor 106 is equal or substantially equal to the quantity of audience members of the panel used to determine the TEI 124. When values other than 1 are used for the weight values ($WT_P$) and ($WT_I$), the resulting TEI 124 is a weighted average value.

To further illustrate Equation 1, consider an example in which a television panel monitored by the media panel monitoring system 120 contains 4,000 audience members (i.e., $WT_P$=4,000) and results in an 80% survey engagement index ($EI_P$) for a particular television show. In addition, a registered user base of 100,000 users (i.e., $WT_I$=100,000) registered in the Internet database proprietor 104 results in a 30% Internet engagement index ($EI_I$) for the same television show. In such an example, the query and reporting server 112 can use Equation 1 to determine that the TEI 124 is equal to 33.7 (i.e., TEI=33.7=((4,000*80)+(100,000*30))/(4,000+100,000)).

In some examples, the query and reporting server 112 uses demographics-based engagement indices to determine the TEI 124 for one or more demographic segments of interest. That is, the example query and reporting server 112 uses engagement indices from the media panel engagement index database 116 that correspond to select demographic segments represented in the demographics database 122. In addition, the example query and reporting server 112 may perform keyword searches only on messages in the Internet message database 106 that were posted by users associated with the same demographics of interest. The query and reporting server 112 may obtain or discern demographics of registered users of the Internet database proprietor 104 based on a cooperative audience measurement relationship between the Internet database proprietor 104 and the media audience measurement entity 102.

Figure 4:
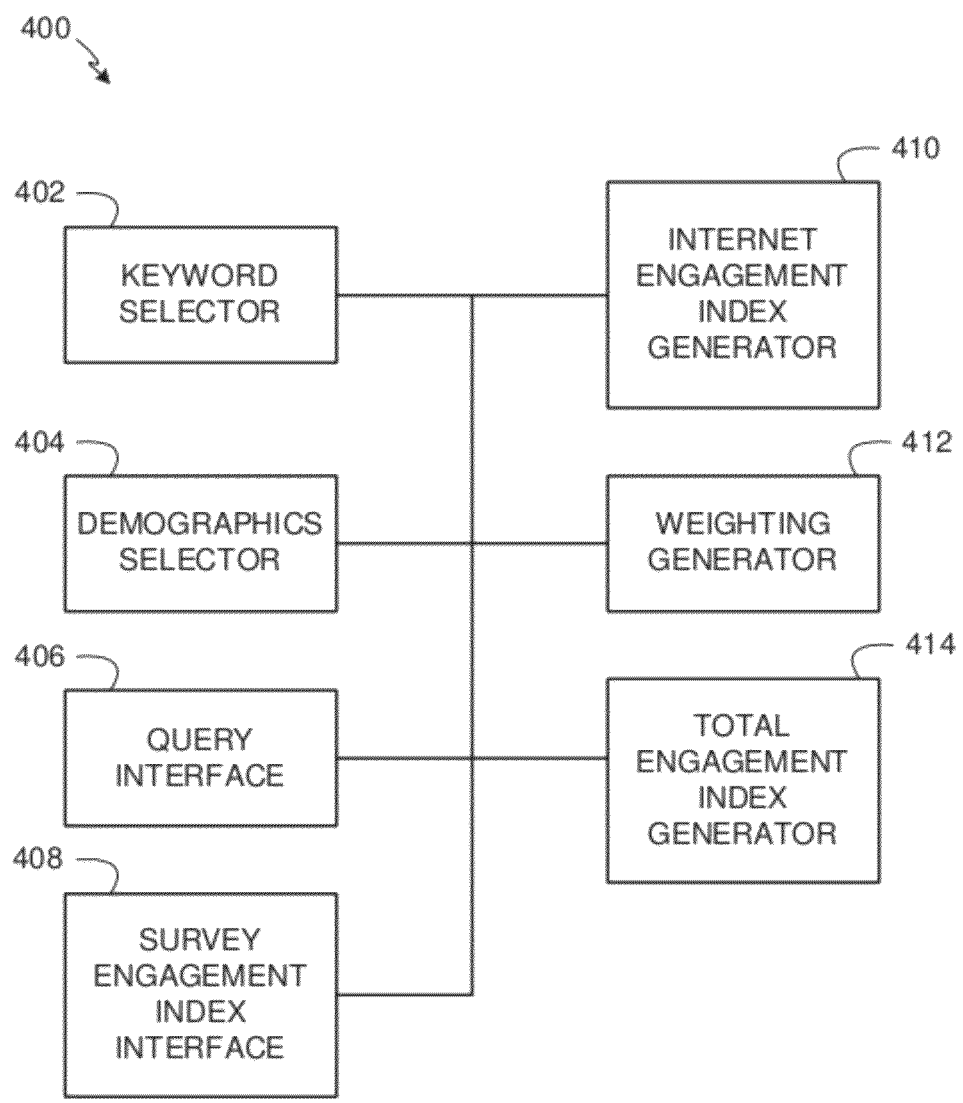
FIG. 4 depicts an example apparatus that may be used to determine audience engagement indices for media presentations.

FIG. 4 illustrates an example implementation 400 of the query and reporting server 112 of FIG. 1. In the illustrated example of FIG. 4, the example apparatus 400 includes an example keyword selector 402, an example demographics selector 404, an example query interface 406, an example survey engagement index interface 408, an example Internet engagement index generator 410, an example weighting generator 412, and an example total engagement index generator 414.

Turning in detail to FIG. 4, the example apparatus 400 is provided with the keyword selector 402 to select keywords related to a target media presentation for searching in Internet message postings (e.g., Internet message postings stored in the Internet message database 110 of FIG. 1). For example, the keyword selector 402 may search one or more records in the media presentation database 114 of a target media presentation for which to determine a TEI (e.g., the TEI 124 of FIG. 1). From the one or more records, the keyword selector 402 selects one or more keywords (e.g., a title) representative of the target media presentation. For example, if the target presentation is "The Daily Show," the keyword selector 402 may select the keywords "daily show" (e.g., a subset of the title) to search for in messages in the Internet message database 110. Alternatively, if the target media presentation is "Myth Busters," the keyword selector 402 may select the keywords "myth busters" representing the entirety of the title of the television program.

To select demographics information in the demographics database 122 of FIG. 1 and/or from the Internet database proprietor 104, the example apparatus 400 is provided with the demographics selector 404. The example demographics selector 404 of FIG. 4 identifies particular panels based on demographics information in the demographics database 122. The information returned by the demographics selector 404 is used to retrieve corresponding survey engagement indices from the survey engagement index database 116 corresponding to the panelists of the selected demographics group.

To perform keyword search queries in the Internet message database 106, the example apparatus 400 of FIG. 4 is provided with the query interface 406. The query interface 406 of the illustrated example receives keywords from the keyword selector 402 for a particular target media presentation and generates a query search string to perform the keyword search exchange 118 (FIG. 1) with the Internet message database 106 via an application program interface (API). In some examples, the query interface 406 generates query search strings that request a username or unique user ID associated with each message containing the searched keywords. The query interface 406 can then tally the quantity of unique usernames or user IDs such that duplicate usernames or unique user IDs are not counted more than once. Alternatively, the database proprietor may implement functionality to ensure the returned quantity represents unique usernames. In either of the example approaches, an impression or exposure is counted once per user even if that user mentioned the keywords in more than one message. In some example implementations, the query interface 406 may also structure query search strings to restrict analysis (e.g., the count of messages) to messages having posting dates/times within particular dates and/or timeframes (e.g., within 24 hours of broadcast, within one week of broadcast, etc.).

To retrieve survey engagement indices ($EI_P$) from the media panel engagement index database 116 (FIG. 1), the example apparatus 400 of FIG. 4 is provided with the survey engagement index interface 408. The example survey engagement index interface 408 of FIG. 4 retrieves survey engagement indices ($EI_P$) from the survey engagement index interface 408 corresponding to target media presentations. In some examples, the survey engagement index interface 408 may limit retrieval of survey engagement indices to evaluate identified by the demographics selector 404.

To generate internet message-based engagement indices ($EI_I$) based on searches performed in the Internet message database 106, the example apparatus 400 of FIG. 4 is provided with the Internet engagement index generator 410. The example Internet engagement index generator 410 of FIG. 4 determines the Internet engagement index ($EI_I$) as discussed above in connection with Equation 1 by dividing the quantity of messages from unique users in the Internet message database 106 that mention the keyword(s) of a target media presentation by the total quantity of registered users of the Internet database proprietor 104 eligible for posting messages stored in the Internet message database 106.

To generate weighting values for determining the TEI 124 (FIG. 1), the example apparatus 400 of FIG. 4 is provided with the weighting generator 412. The example weighting generator 412 of FIG. 4 determines the weight values ($WT_P$) and ($WT_I$) as described above in connection with Equation 1 to account for different media panels having quantities of audience members different from the quantity of registered users of the Internet database proprietor 104.

To determine the TEI 124 (FIG. 1), the apparatus 400 is provided with the total engagement index generator 414. The example total engagement index generator 414 of FIG. 4 determines the TEI 124 using Equation 1 as described above.

While an example manner of implementing the apparatus 400 has been illustrated in FIG. 4, one or more of the elements, processes and/or devices illustrated in FIG. 4 may be combined, divided, re-arranged, omitted, eliminated and/or implemented in any other way. Further, the keyword selector 402, the demographics selector 404, the query interface 406, the survey engagement index interface 408, the Internet engagement index generator 410, the weighting generator 412, and the total engagement index generator 414 and/or, more generally, the example apparatus 400 of FIG. 4 may be implemented by hardware, software, firmware and/or any combination of hardware, software and/or firmware. Thus, for example, any of the keyword selector 402, the demographics selector 404, the query interface 406, the survey engagement index interface 408, the Internet engagement index generator 410, the weighting generator 412, and the total engagement index generator 414 and/or, more generally, the example apparatus 400 could be implemented by one or more circuit(s), programmable processor(s), application specific integrated circuit(s) (ASIC(s)), programmable logic device (s) (PLD(s)) and/or field programmable logic device(s) (FPLD(s)), etc. When any of the appended apparatus claims are read to cover a purely software and/or firmware implementation, at least one of the keyword selector 402, the demographics selector 404, the query interface 406, the survey engagement index interface 408, the Internet engagement index generator 410, the weighting generator 412, and/or the total engagement index generator 414 are hereby expressly defined to include a computer readable medium such as a memory, DVD, CD, etc. storing the software and/or firmware. Further still, the example apparatus 400 of FIG. 4 may include one or more elements, processes and/or devices in addition to, or instead of, those illustrated in FIG. 4, and/or may include more than one of any or all of the illustrated elements, processes and devices.

Figure 5:
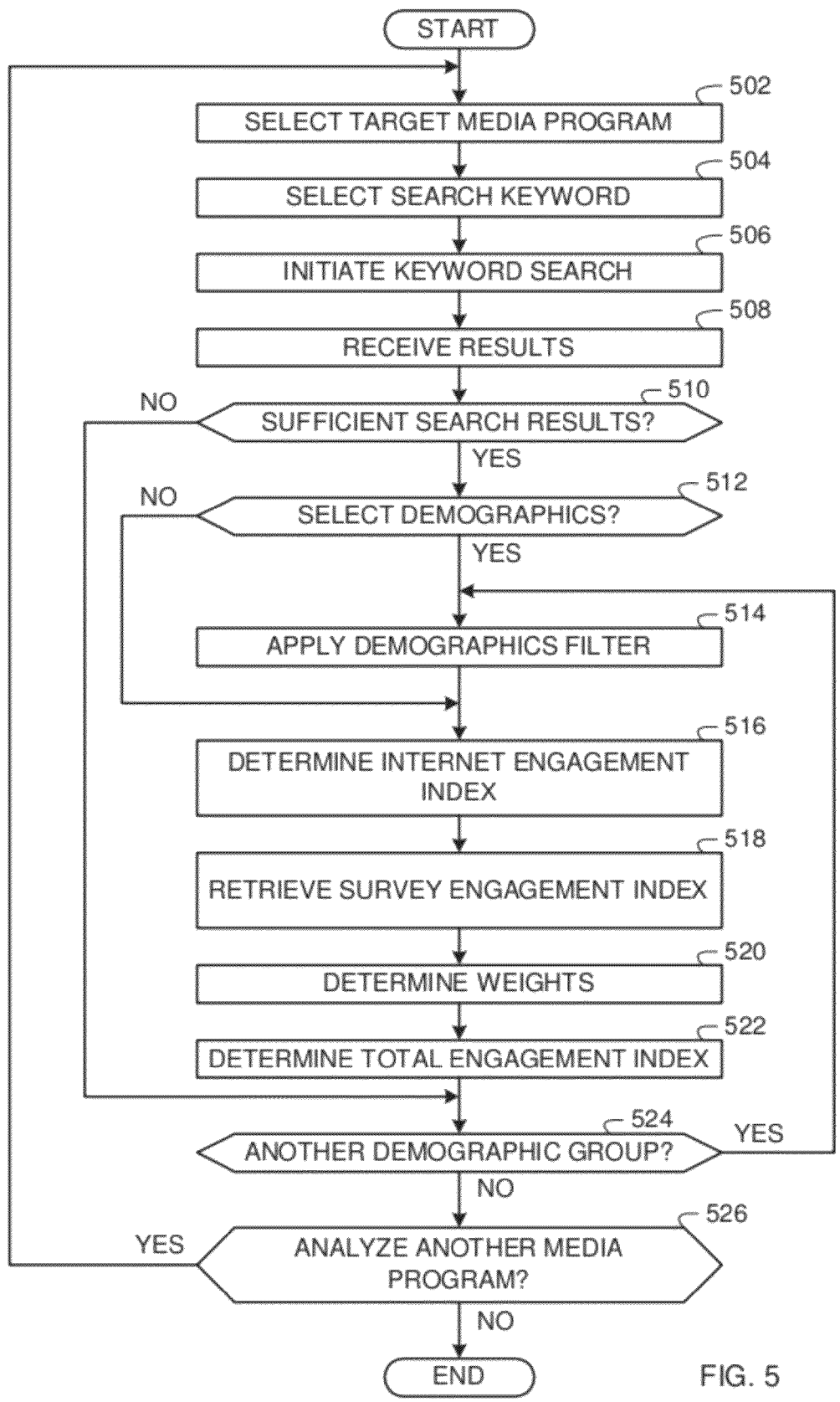
FIG. 5 is a flow diagram representative of example machine readable instructions that may be executed to implement the apparatus of FIG. 4 to determine audience engagement indices of media presentations based on engagement levels measured from media panels and Internet message postings.

FIG. 5 is a flow diagram representative of example machine readable instructions that may be executed to determine TEIs (e.g., the TEI 124 of FIG. 1) of media presentations based on engagement levels measured from media panels and Internet message postings to implement the example query and reporting server 112 of FIG. 1 and/or the example apparatus 400 of FIG. 4. The example process of FIG. 5 may be implemented using machine readable instructions that, when executed, cause a device (e.g., a programmable controller, processor, or other programmable machine or integrated circuit) to perform the operations shown in FIG. 5. For instance, the example process of FIG. 5 may be performed using a processor, a controller, and/or any other suitable processing device. For example, the example process of FIG. 5 may be implemented using coded instructions stored on a tangible machine readable medium such as a flash memory, a read-only memory (ROM), and/or a random-access memory (RAM).

As used herein, the term tangible computer readable medium is expressly defined to include any type of computer readable storage and to exclude propagating signals. Additionally or alternatively, the example process of FIG. 5 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, the example process of FIG. 5 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, the example process of FIG. 5 may be implemented as any combination(s) of any of the foregoing techniques, for example, any combination of firmware, software, discrete logic and/or hardware.

Although the example process of FIG. 5 is described with reference to the flow diagram of FIG. 5, other methods of implementing the process of FIG. 5 may be employed. For example, the order of execution of the blocks may be changed, and/or some of the blocks described may be changed, eliminated, sub-divided, or combined. Additionally, one or both of the example process of FIG. 5 may be performed sequentially and/or in parallel by, for example, separate processing threads, processors, devices, discrete logic, circuits, etc.

Turning in detail to FIG. 5, initially, the example apparatus 400 selects a target media presentation (block 402). For example, the apparatus 400 may receive a name or identifier of a target media presentation from a user interacting with the query and reporting server 112 (FIG. 1) or may select a target media presentation in an automated manner from a pre-stored list of media presentation pre-selected for the query and reporting server 112 to generate TEIs (e.g., the TEI 124 of FIG. 1).

The example keyword selector 402 (FIG. 4) then selects one or more keywords associated with the target media presentation (block 504). For example, the keyword selector 402 may analyze one or more entries in the media presentation database 114 corresponding to the target media presentation and select the one or more keywords (e.g., from a title or any other metadata) representative of the target media presentation.

The query interface 406 (FIG. 4) initiates a keyword search in the Internet message database 106 (block 506) to perform the keyword search exchange 118 of FIG. 1. The query interface 406 receives search results (block 508) and determines whether there are sufficient search results (block 510) related to the target media presentation to determine a meaningful TEI (e.g., the TEI 124 of FIG. 1) based on Internet message postings in the Internet message database 106. For example, if the quantity of search results is too low (or if no matches are found), any resulting Internet engagement index may not fairly or sufficiently contribute to an accurate or meaningful TEI. That is, the resulting Internet engagement index may be a statistical outlier or a meaningless anomaly relative to a survey engagement index in the media panel engagement index database 116 (FIG. 1) for the same target media program.

If there are sufficient search results (block 510), control advances to block 512, at which the demographics interface 404 (FIG. 4) determines whether to select particular demographics (block 512). For example, the apparatus 400 may receive demographics of a target audience group from a user interacting with the query and reporting server 112 (FIG. 1) or may select target demographics in an automated manner from a pre-stored list of demographics-based groups pre-selected for the query and reporting server 112 to generate TEIs (e.g., the TEI 124 of FIG. 1). If the demographics interface 404 selects target demographics (block 512), the demographics selector 404 applies a demographics filter (block 514). For example, the demographics selector 404 may identify survey engagement indices in the media panel engagement index database 116 that are associated with panelists having select target demographics of interest. Additionally, the demographics interface 404 may work with the query interface 406 to filter the search results from the Internet message database 106 based on the target demographics.

In some examples, the example query interface 406 submits the target demographics to the Internet database proprietor 104 with a listing of usernames or unique user IDs received in the keyword search results at block 508 and request the Internet database proprietor 104 to filter the usernames or unique user IDs based on the target demographics. The Internet database proprietor 104 may filter the usernames or unique user IDs based on corresponding demographics information stored in the UA database 107 and return the filtered results (i.e., filtered usernames or unique user IDs associated with matching demographics) to the query interface 406.

In some examples, the Internet database proprietor 104 provides the media audience measurement entity 102 with access to the UA database 107, and the demographics selector 404 applies the demographics filter to the keyword search results (e.g., the usernames or unique user IDs) at the operation of block 514 by directly accessing demographics information of registered users in the UA database 107.

After applying the demographics filter (block 514) or if the demographics interface 404 determines that it should not select particular demographic group(s) (block 512), control advances to block 516, at which the Internet engagement index generator 410 (FIG. 4) determines an Internet engagement index ($EI_I$) (block 516) as discussed above in connection with Equation 1 based on the keyword search results received at block 508 and/or filtered at block 514.

The survey engagement index interface 408 (FIG. 4) retrieves a survey engagement index ($EI_P$) (block 518) from the media panel engagement index database 116 corresponding to the target media program. In examples in which particular demographics were applied at block 514, the survey engagement index interface 408 selects the survey engagement index ($EI_P$) based also on the target demographics.

The example weighting generator 412 (FIG. 4) determines weight values (block 520). For example, the weighting generator 412 may determine the panel weighting value ($WT_P$) and the Internet weighting value ($WT_I$) as discussed above in connection with Equation 1. The total engagement index generator 414 (FIG. 4) determines the TEI 124 (FIG. 1) (block 522) based on the Internet engagement index ($EI_I$), the survey engagement index ($EI_P$), the panel weighting value ($WT_P$), and the Internet weighting value ($WT_I$) as discussed above in connection with Equation 1.

The example apparatus 400 determines whether there is another target demographic group for which to generate a TEI for the same target media presentation (block 524). If there is another demographic group, control returns to block 514. Otherwise, the apparatus 400 determines whether there is another target media presentation to analyze (block 526). If there is another target media presentation to analyze (e.g., another target media presentation indicated by a user or located on a pre-defined target media presentation list), control returns to block 502. Otherwise, the example process of FIG. 5 is ended.

Although examples described above involve the media audience measurement entity 102 as communicating with only one Internet database proprietor (i.e., the Internet database proprietor 104), in other examples, the media audience measurement entity 102 may communicate with any number of Internet database proprietors and generate TEIs based on data received from any number of Internet database proprietors.

Figure 6:
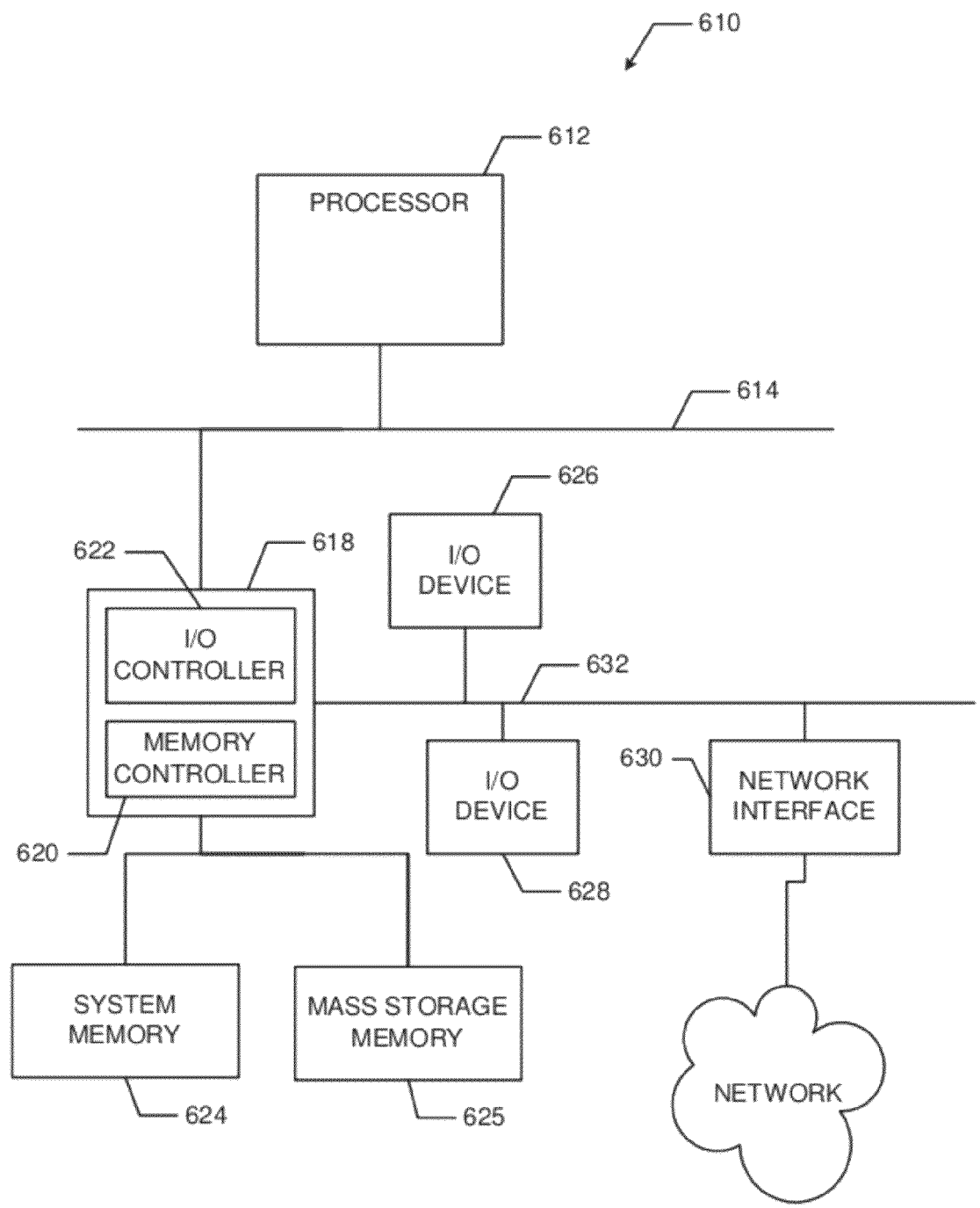
FIG. 6 is an example processor system that can be used to execute example instructions of FIG. 5 to implement the example apparatus of FIG. 4.

FIG. 6 is a block diagram of an example processor system 610 that may be used to execute the example computer readable instructions of FIG. 5 to implement the example query and reporting server 112 of FIG. 1 and/or the example apparatus 400 of FIG. 4. As shown in FIG. 6, the processor system 610 includes a processor 612 that is coupled to an interconnection bus 614. The processor 612 may be any suitable processor, processing unit, or microprocessor. Although not shown in FIG. 6, the system 610 may be a multi-processor system and, thus, may include one or more additional processors that are identical or similar to the processor 612 and that are communicatively coupled to the interconnection bus 614.

The processor 612 of FIG. 6 is coupled to a chipset 618, which includes a memory controller 620 and an input/output (I/O) controller 622. A chipset provides I/O and memory management functions as well as a plurality of general purpose and/or special purpose registers, timers, etc. that are accessible or used by one or more processors coupled to the chipset 618. The memory controller 620 performs functions that enable the processor 612 (or processors if there are multiple processors) to access a system memory 624 and a mass storage memory 625.

In general, the system memory 624 may include any desired type of volatile and/or non-volatile memory such as, for example, static random access memory (SRAM), dynamic random access memory (DRAM), flash memory, read-only memory (ROM), etc. The mass storage memory 625 may include any desired type of mass storage device including hard disk drives, optical drives, tape storage devices, etc.

The I/O controller 622 performs functions that enable the processor 612 to communicate with peripheral input/output (I/O) devices 626 and 628 and a network interface 630 via an I/O bus 632. The I/O devices 626 and 628 may be any desired type of I/O device such as, for example, a keyboard, a video display or monitor, a mouse, etc. The network interface 630 may be, for example, an Ethernet device, an asynchronous transfer mode (ATM) device, an 802.11 device, a digital subscriber line (DSL) modem, a cable modem, a cellular modem, etc. that enables the processor system 610 to communicate with another processor system.

While the memory controller 620 and the I/O controller 622 are depicted in FIG. 6 as separate functional blocks within the chipset 618, the functions performed by these blocks may be integrated within a single semiconductor circuit or may be implemented using two or more separate integrated circuits.

Although the following discloses example methods, apparatus, systems, and articles of manufacture including, among other components, firmware and/or software executed on hardware, it should be noted that such methods, apparatus, systems, and articles of manufacture are merely illustrative and should not be considered as limiting. For example, it is contemplated that any or all of these hardware, firmware, and/or software components could be embodied exclusively in hardware, exclusively in firmware, exclusively in software, or in any combination of hardware, firmware, and/or software. Accordingly, while the following describes example methods, apparatus, systems, and articles of manufacture, such provided examples are not the only ways to implement such methods, apparatus, systems, and articles of manufacture.

Although certain example methods, apparatus, systems, and articles of manufacture have been described herein, the scope of coverage of this patent is not limited thereto. On the contrary, this patent covers all methods, apparatus and articles of manufacture fairly falling within the scope of the claims of this patent.

What it claimed is:

1. A method, comprising:
   when a quantity of messages that are posted on an Internet service and that contain a keyword associated with a media presentation exceed a threshold number of messages, determining, via a processor, an Internet engagement indice associated with the media presentation based on the messages;
   determining a survey engagement indice based on a survey of panel members exposed to the media presentation;
   weighting the Internet engagement indice with a first weight;
   weighting the survey engagement indice with a second weight, the first and second weights being based on a total number of users in a targeted group registered with the Internet service and a total number of panel members in the targeted group; and
   determining a composite engagement indice based on the weighted Internet engagement indice and the weighted survey engagement indice.

2. A method as defined in claim 1, further comprising selecting the keyword from a title of the media presentation.

3. A method as defined in claim 1, wherein determining the composite engagement indice comprises:
   determining an average of the weighted Internet audience engagement indice and the weighted survey engagement indice.

4. A method as defined in claim 1, wherein the first weight is proportional to the total number of users in the targeted group registered with the Internet service, and the second weight is proportional to the total number of panel members in the targeted group.

5. A method as defined in claim 1, wherein the media presentation is at least one of a television program, a radio program, or Internet-based media.

6. A method as defined in claim 1, further comprising retrieving the keyword from a database containing information associated with the media presentation.

7. A method as defined in claim 1, wherein the messages are from members of the Internet service, and the Internet engagement indice is representative of the engagement of the members with the media presentation.

8. A method as defined in claim 1, further comprising using an application program interface to analyze the messages to find matches with the keyword.

9. A method as defined in claim 1, wherein the Internet service is a social network.

10. An apparatus, comprising:
    an Internet engagement index generator to determine an Internet engagement index based on matches between a keyword associated with a media presentation and messages posted on an Internet service after a quantity of the matches exceed a threshold quantity of matches; and
    a total engagement index generator to determine a composite engagement index by:
       weighting the Internet engagement index with a first weight,
       weighting a survey engagement index with a second weight, the first and second weights being based on a total number of users in a targeted group registered with the Internet service and a total number of panel members in the targeted group, the survey engagement index being indicative of an engagement of surveyed persons with the media presentation, and
       determining an average based on the weighted Internet audience engagement index and the weighted survey engagement index.

11. An apparatus as defined in claim 10, wherein the total engagement index generator is to determine the composite engagement index by:
    determining an average based on the weighted Internet audience engagement index and the weighted survey engagement index.

12. An apparatus as defined in claim 10, wherein the first weight is proportional to the total number of users in the targeted group registered with the Internet service, and the second weight is proportional to the total number of panel members in the targeted group.

13. An apparatus as defined in claim 10, wherein the media presentation is at least one of a television program, a radio program, or Internet-based media.

14. An apparatus as defined in claim 10, further comprising a keyword selector to retrieve the keyword from a database containing information associated with the media presentation.

15. An apparatus as defined in claim 10, wherein the messages are from registered users of the Internet service, and the Internet engagement index is representative of the engagement of the participants to the media presentation.

16. An apparatus as defined in claim 10, further comprising a query interface to analyze the messages to find matches with the keyword.

17. An apparatus as defined in claim 10, wherein the Internet service is a social network.

18. A tangible machine readable storage medium comprising machine readable instructions that, when executed, cause a machine to at least:
    after a quantity of messages posted on an Internet service and containing a keyword associated with a media presentation exceed a threshold, determine an Internet engagement indice based on the messages; and
    determine a composite engagement indice by:
        weighting the Internet engagement index with a first weight,
        weighting a survey engagement index with a second weight, the first and second weights being based on a total number of users in a targeted group registered with the Internet service and a total number of panel members in the targeted group, the survey engagement index being indicative of an engagement of surveyed persons with the media presentation, and
        determining an average based on the weighted Internet audience engagement index and the weighted survey engagement index.

19. A tangible machine readable storage medium as defined in claim 18, wherein the instructions, when executed, cause the machine to determine the composite engagement indice by:
    determining an average of the weighted Internet audience engagement indice and the weighted survey engagement indice.

20. A method as defined in claim 1, wherein the plurality of messages correspond to a first group of registered users of the Internet service, and wherein some users in the first group of registered users posted multiple messages of the plurality of messages, and determining the Internet engagement indice by:
    determining a message tally based on the plurality of messages containing the keyword, the message tally tallying only one message for each user in the first group of users; and
    dividing the message tally by a total quantity of the registered users of the Internet service that are eligible to post messages.

21. A method as defined in claim 1, wherein the Internet engagement indice is based on a number of unique users in the targeted group associated with the quantity of messages containing the keyword and the total number of users in the targeted group registered with the Internet service.

22. A method as defined in claim 1, wherein the survey engagement indice is based on a number of panel members in the targeted group exposed to the media presentation and a total number of panel members in the targeted group.

23. An apparatus as defined in claim 10, wherein the Internet engagement indice is based on a number of unique users in the targeted group associated with the quantity of messages containing the keyword and the total number of users in the targeted group registered with the Internet service.

24. An apparatus as defined in claim 10, wherein the survey engagement indice is based on a number of panel members in the targeted group exposed to the media presentation and a total number of panel members in the targeted group.

25. A tangible machine readable storage medium as defined in claim 18, wherein the first weight is proportional to the total number of users in the targeted group registered with the Internet service, and the second weight is proportional to the total number of panel members in the targeted group.

26. A tangible machine readable storage medium as defined in claim 18, wherein the Internet engagement indice is based on a number of unique users in the targeted group associated with the quantity of messages containing the keyword and the total number of users in the targeted group registered with the Internet service, and the survey engagement indice is based on a number panel members in the targeted group exposed to the media presentation and a total number of panel members in the targeted group.

* * * * *